United States Patent
Gomez et al.

(10) Patent No.: US 8,637,414 B2
(45) Date of Patent: Jan. 28, 2014

(54) GRADIENT DENSITY PADDING MATERIAL AND METHOD OF MAKING SAME

(75) Inventors: Durward Gomez, Lewisville, NC (US); Steven Borchardt, Clemmons, NC (US)

(73) Assignee: Lydall, Inc., Manchester, CT (US)

( * ) Notice: Subject to any disclaimer, the term of this patent is extended or adjusted under 35 U.S.C. 154(b) by 845 days.

(21) Appl. No.: 10/419,765

(22) Filed: Apr. 22, 2003

(65) Prior Publication Data

US 2003/0199216 A1    Oct. 23, 2003

Related U.S. Application Data

(60) Provisional application No. 60/374,140, filed on Apr. 22, 2002.

(51) Int. Cl.
| | |
|---|---|
| *D04H 1/54* | (2012.01) |
| *D04H 1/00* | (2006.01) |
| *E04B 1/84* | (2006.01) |
| *B29C 43/24* | (2006.01) |

(52) U.S. Cl.
USPC ........... 442/409; 442/327; 264/175; 181/264; 156/311

(58) Field of Classification Search
USPC ................ 442/327–417; 156/311; 181/169
See application file for complete search history.

(56) References Cited

U.S. PATENT DOCUMENTS

| | | | |
|---|---|---|---|
| 3,652,377 A | | 3/1972 | Helmick |
| 3,660,222 A | * | 5/1972 | Fleming et al. ............... 442/359 |
| 4,131,664 A | | 12/1978 | Flowers et al. |
| 4,196,245 A | | 4/1980 | Kitson et al. |
| 4,213,516 A | | 7/1980 | Sulewsky |
| 4,474,846 A | | 10/1984 | Doerer et al. |
| 4,568,581 A | | 2/1986 | Peoples, Jr. |
| 4,661,132 A | | 4/1987 | Thornton et al. |
| 4,950,355 A | | 8/1990 | Klose |

(Continued)

FOREIGN PATENT DOCUMENTS

| | | |
|---|---|---|
| DE | 22 49 138 A | 4/1974 |
| EP | 0795916 A1 | 9/1997 |

(Continued)

OTHER PUBLICATIONS

"Horizontal lapping", Textiles Intelligence Glossary, www.textilesintelligence.com.*

(Continued)

*Primary Examiner* — Jennifer A Steele
(74) *Attorney, Agent, or Firm* — Cantor Colburn LLP

(57) ABSTRACT

A gradient density padding material includes a single layer of nonwoven material having at least one surface processed to form a portion of a thickness thereof having a density increased with respect to a remaining portion of the thickness thereof. The single layer of nonwoven material after processing has an airflow resistance within the range of 200-4000 MKS Rayls, wherein said single layer of nonwoven material has an enhanced acoustic performance. A method of making a gradient density padding material having an enhanced acoustic performance includes the steps of providing a single layer of nonwoven material and processing at least one surface of the single layer of nonwoven material to form a portion of a thickness thereof having a density increased with respect to a remaining portion of the thickness thereof. The single layer of nonwoven material after processing has an airflow resistance within the range of 200-4000 MKS Rayls.

10 Claims, 4 Drawing Sheets

(56) References Cited

U.S. PATENT DOCUMENTS

| | | | |
|---|---|---|---|
| 5,334,338 A | 8/1994 | Kittel et al. | |
| 5,456,872 A | 10/1995 | Ahrweiler | |
| 5,554,238 A | 9/1996 | English | |
| 5,591,289 A | 1/1997 | Souders et al. | |
| 5,759,927 A | 6/1998 | Meeker | |
| 5,811,178 A | 9/1998 | Adam et al. | |
| 5,824,973 A | 10/1998 | Haines et al. | |
| 5,841,081 A | 11/1998 | Thompson et al. | |
| RE36,323 E | 10/1999 | Thompson et al. | |
| 6,048,809 A | 4/2000 | Brow et al. | |
| 6,145,617 A | 11/2000 | Alts | |
| 6,165,921 A | 12/2000 | Nagata et al. | |
| 6,217,691 B1* | 4/2001 | Vair et al. | 156/176 |
| 6,296,075 B1 | 10/2001 | Gish et al. | |
| 6,355,079 B1 | 3/2002 | Sorvari et al. | |
| 6,358,592 B2* | 3/2002 | Vair et al. | 428/74 |
| 6,376,396 B1 | 4/2002 | Thorn et al. | |
| 6,454,048 B1 | 9/2002 | Alts et al. | |
| 6,534,145 B1 | 3/2003 | Boyles | |
| 6,572,723 B1 | 6/2003 | Tilton et al. | |
| 6,602,581 B2* | 8/2003 | Aneja | 428/182 |
| 6,631,785 B2 | 10/2003 | Khambete et al. | |
| 6,659,223 B2 | 12/2003 | Allison et al. | |
| 6,669,265 B2 | 12/2003 | Tilton et al. | |
| 6,713,150 B2 | 3/2004 | Alts et al. | |
| 6,720,068 B1 | 4/2004 | Venbemmel et al. | |
| 6,726,980 B2 | 4/2004 | Staelgraeve et al. | |
| 6,797,653 B2* | 9/2004 | Fay | 442/85 |
| 2001/0050139 A1 | 12/2001 | Vair, Jr. et al. | |
| 2002/0160682 A1 | 10/2002 | Zeng et al. | |
| 2003/0060113 A1 | 3/2003 | Christie et al. | |
| 2003/0106741 A1 | 6/2003 | Tompson et al. | |
| 2003/0146545 A1 | 8/2003 | Wenstrup | |
| 2003/0168146 A1 | 9/2003 | Wenstrup et al. | |

FOREIGN PATENT DOCUMENTS

| | | | |
|---|---|---|---|
| EP | 1 154 087 A | 11/2001 | |
| JP | 59186750 A2 | 10/1984 | |
| JP | 10-207469 | 8/1998 | |
| JP | 2001-513217 | 8/2001 | |
| JP | 2002-505209 | 2/2002 | |
| WO | WO 99 44817 A | 9/1999 | |
| WO | WO 02/09089 A1 * | 1/2002 | G10K 11/162 |

OTHER PUBLICATIONS

"Polypropylene fibers", Complete Textile Glossary, Celanese Acetate, 2001 (3 pages).*
Tortora, Phyllis et al. "Understanding Textiles", Prentice Hall, 1997, pp. 38-39.*
PI 0309489-8_Brazilian Office Action mailed on Sep. 1, 2011.

* cited by examiner

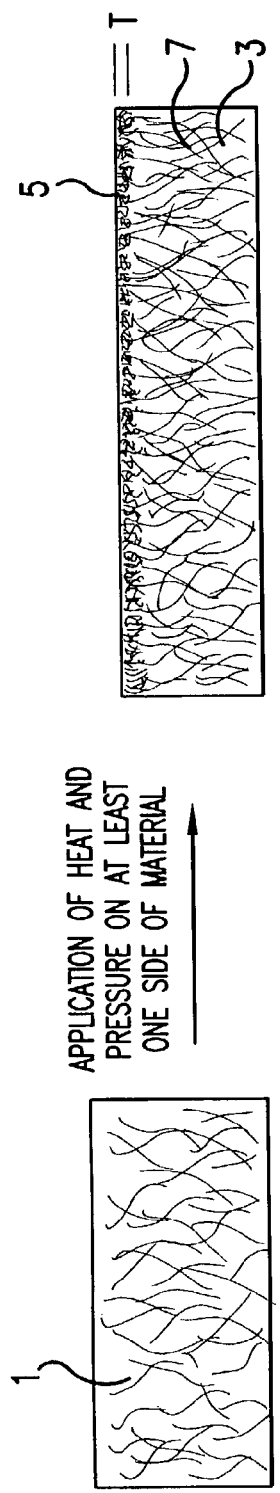
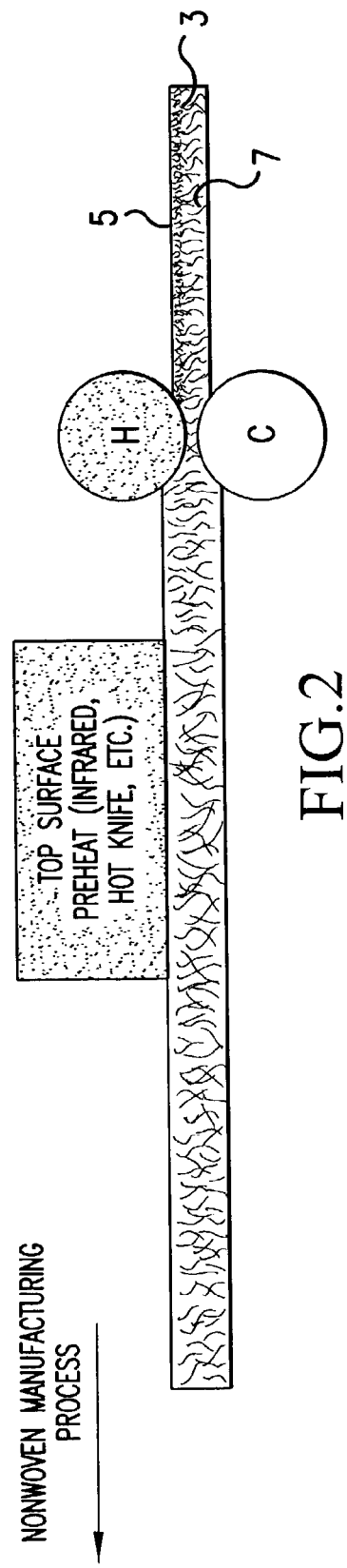

GRADIENT DENSITY PADDING MATERIAL AND METHOD OF MAKING SAME

CROSS-REFERENCE TO RELATED APPLICATIONS

This non-provisional application claims priority under 35 U.S.C. §119(e) on U.S. Provisional Patent Application No. 60/374,140, filed on Apr. 22, 2002, the entirety of which is incorporated herein by reference.

BACKGROUND OF THE INVENTION

1. Field of the Invention

The present invention relates to a padding material for acoustic applications. In particular, the present invention relates to a gradient density padding material, wherein the density of a portion of the thickness of the padding material is increased to increase the air flow resistance of the padding material. In view of this, the acoustic properties of the padding material can be tuned to a particular application.

2. Description of Background Art

There is a growing trend in today's acoustical insulation market for lightweight materials. The transportation industry is a good example of where there is a need for lightweight acoustical insulation. Traditional interior and exterior acoustical insulators have used heavy layers in decoupled mass systems to reduce interior noise levels. A recent trend in this market has been to eliminate these heavy layer systems and use lightweight fiber or foam based padding systems. There are a variety of these materials out in the market today. All of these fiber systems utilize a multilayer fiber pad to produce a lightweight padding system with good acoustic absorption in the range of 100-5000 Hz and little or no sound level degradation in the interior of a vehicle when compared to heavy layer systems. It is known in the acoustic field that acoustic absorption performance is dependent in part on the airflow resistance of materials. It is also known that by increasing the airflow resistance of an acoustic material, the low to mid frequency (100-2500 Hz) absorption performance can be increased. Maximum acoustic absorption in this frequency range occurs when that material has an airflow resistance of 800-1200 MKS Rayls. This frequency range is often the most difficult to combat in vehicle systems where weight, cost, and packaging space (thickness) are limited. All of today's multilayer systems require 2 or more separate layers, where each layer is produced independently with specific stiffness, strength, and airflow resistance properties. These independent layers must then be bonded together in a secondary operation.

One example of a multilayer system according to the background art is described in U.S. Pat. No. 6,145,617. In this patent, a compressed nonwoven fiber layer is bonded to an uncompressed fiber layer. A second example is described in U.S. Pat. No. 6,296,075. In this patent, a high flow resistant facing or coverstock material is attached to the surface of a low density fiber web. A third example is described in U.S. Pat. No. 5,824,973. In this patent, a low density fiber web includes a microporous film attached to a surface thereof. A fourth example is described in U.S. Pat. No. 5,334,338. In this patent, a dense foam layer with low open cell count is produced on top of a porous, low density open cell foam layer.

SUMMARY OF THE INVENTION

The present invention is based on the discovery that enhanced performance properties can be produced using a single layer of nonwoven fibrous padding material. The present invention is directed to a single layer of nonwoven fibrous padding material with enhanced properties and a process for making the same. By producing a single layer of nonwoven fibrous padding and applying significant heat and pressure to one side of the material, a single layer of acoustic padding material is produced with enhanced performance properties. As shown in FIG. 1 of the present invention, the uniform density nonwoven padding material 1 is processed to form a gradient density padding material 3 having a top surface portion 5 with an increased density and a base material portion 7 with a lower density. The inventors of the present invention have determined that the increased density top portion 5 provides a number of enhancements to the base material portion. The present invention is directed to a product and process for making a nonwoven fibrous padding material, which will provide an acoustic solution that is much less expensive to produce than other lightweight systems using multiple layers of material.

The enhancements provided by the increased density top portion include:

(1). Increased material strength of the padding material in the machine and cross directions;
(2). Increased airflow resistance of the padding material for the increased density portion of surface thickness T;
(3). Increased density of the padding material for the increased density portion of surface thickness T;
(4). Increased vibration isolation performance of the padding material from a decoupled mass effect; and
(5). Decreased delamination of the padding material during secondary operations such as molding.

All of the above are performance benefits of the single layer product of the present invention when compared with the multi layer products of the background art.

The increased material strength enables the padding material to be processed through secondary operations, such as die-cutting and molding operations. Many nonwoven and foam padding materials have low strength in their X-Y planes. In particular, many of the lightweight padding systems utilize low density materials with tensile and tear strength properties that are not great enough for the intended processes and final applications. Therefore, these materials must include strengthening layers in order to provide the strength necessary for most automotive applications. The present invention provides increased strength in the X-Y plane of a lightweight padding material. The density and thickness of the top surface portion of the single layer of nonwoven material can be designed so that the material will meet most automotive strength requirements without the use of additional strengthening layers. Of course, it should be understood that it is also possible to add other functional or non-functional layers of material to the single layer of nonwoven fibrous padding material in order to further increase the material strength, if necessary for a particular application, or to affect other properties or aesthetic characteristics of the padding material.

The increased airflow resistance of the increased density top surface greatly increases the low to mid frequency acoustic absorption. Due to the limited packaging space available in a vehicle for acoustical products, the thickness of these materials is usually limited to 1" or less. Low to mid frequency sound waves (100-2500 Hz) are the most difficult acoustic waves to absorb with materials less than 1" thick. This is mainly because the wavelength of sound in this frequency range is much greater than the thickness of the acoustical insulation. The increased airflow resistance of the increased density top surface of the single layer of nonwoven fibrous padding material of the present invention greatly improves the acoustic absorption in these frequencies.

By producing the increased airflow resistance section with densely packed fibers, absorption performance is increased even beyond much of the background art on this subject. Much of the background art teaches the addition of a separate microporous film, nonwoven, or similar lightweight cover layer to provide the airflow resistance. In the present invention; however, the increased density top portion of the single layer of nonwoven fibrous padding material provides the airflow resistance throughout the entirety of the densified portion. The densified portion will have an airflow resistivity that is lower than much of the background art. Airflow resistivity is the total airflow resistance of a material divided by its thickness. Acoustic materials with high airflow resistivity will generally have poor high frequency absorption. A greater portion of the high frequency acoustic waves will be reflected off of the surface of a material if it has high airflow resistivity. In contrast, the padding material of the present invention provides the necessary total airflow resistance of the material without having a portion of material with high airflow resistivity. Therefore, a material is produced from a single layer with increased low and mid frequency absorption, without loss of absorption in the higher frequencies (2500-10,000 Hz). Also, since the airflow resistance of the material is provided by a densified fiber portion, the acoustic waves must travel through a tortuous path with a large amount of fiber surface area. This tortuous path increases the surface area to increase the acoustic absorption of the present invention over the background art concepts that utilize separate microporous films, nonwovens, or similar lightweight cover layers.

The increased density of the top portion of the padding material produces a decoupled mass system helping to reduce vibration transmission. This property is even further enhanced when the material is used with additional top layers such as a carpet. This type of decoupled mass system will generally limit the amount of vibration that is transferred through the material. This property greatly increases the acoustic performance of the product in applications where the material is mounted against vibrating panels such as vehicle floorpans. Producing a single layer padding material with enhanced performance as described above provides a lightweight acoustical material at a very cost effective price. This enhanced padding system can be used in lieu of traditional decoupled mass acoustic systems to provide a significant cost and system weight savings. This system will also cost less to produce than other multi-layer lightweight systems.

The product and method of the present invention also avoids the occurrence of delamination during secondary processing. This is a common occurrence in the multilayer structures according to the background art. The shear stresses that are experienced in, for example, molding of the product can separate the individual layers of material. In the present invention; however, the material is formed from a single layer of material having an increased density portion. Accordingly, there is no attachment line that can be separated during secondary processing.

The above aspects of the present invention are accomplished by a gradient density padding material, comprising a single layer of nonwoven material, said single layer of nonwoven material having at least one surface thereof processed to form a portion of a thickness thereof having a density increased with respect to a remaining portion of the thickness thereof, said single layer of nonwoven material after processing having an airflow resistance within the range of 200-4000 MKS Rayls, wherein said single layer of nonwoven material has an enhanced acoustic performance.

The above aspects of the present invention are also accomplished by a method of making a gradient density padding material having an enhanced acoustic performance, said method comprising the steps of providing a single layer of nonwoven material; and processing at least one surface of said single layer of nonwoven material to form a portion of a thickness thereof having a density increased with respect to a remaining portion of the thickness thereof, said single layer of nonwoven material after processing having an airflow resistance within the range of 200-4000 MKS Rayls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a schematic of the process of the present invention, which illustrates the gradient density padding material according to the present invention;

FIG. 2 is a schematic of an embodiment of the process of the present invention;

DETAILED DESCRIPTION OF THE PREFERRED EMBODIMENTS

Figure 3:
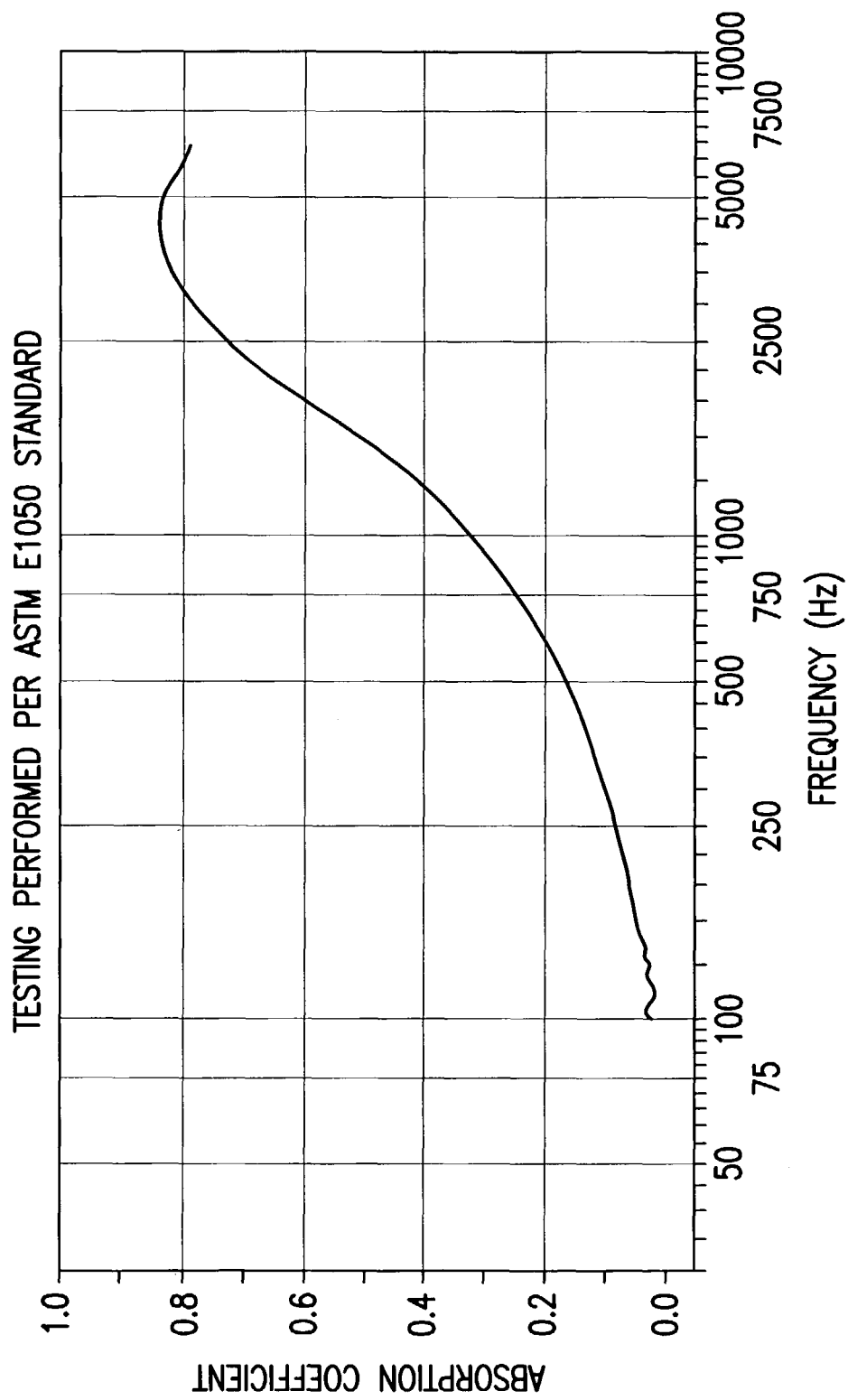
FIG. 3 is a graph of the absorption coefficient vs. frequency before the gradient density process of the present invention is performed.

The present invention will now be described with reference to the accompanying drawings. Referring to FIG. 1, a single layer of low density nonwoven material 1 can be formed by any known means. For example, the nonwoven material 1 can be formed by vertical lapping or horizontal lapping. Alternatively, the nonwoven material 1 can be formed by needle punching, thermal bonding, adhesive bonding, stitch bonding, hydroentangling, wet laying, air laying, meltblowing or spunbonding.

In order to produce a gradient density padding material 3 as described above, the nonwoven material 1 must be originally manufactured using a significant percentage of thermoplastic fibers. The material can be a blend of any fibers as long as the material is made up of at least 20% thermoplastic fiber. Preferably, the nonwoven material would be made from a blend of 65-80% thermoplastic fibers and 20-35% non-melting fibers. However, it is also possible to construct the nonwoven material from 100% thermoplastic fibers if the application so demands. The thermoplastic fibers can be constructed, for example, from polyesters, polyamides or polyolefins or a blend of two or more different thermoplastic fibers. The non-thermoplastic fibers can be inorganic, natural or synthetic materials. For example, the inorganic material fibers can be constructed from glass, ceramic, mineral, basalt, silica, etc. The natural material fibers can be cotton, wool, hemp, ramie, kenaf, flax, etc. Furthermore, the synthetic material fibers can be constructed from acrylics, aramids, sulfars (PPS), PBI, Peek, Melamine, Phenolic, Carbon Preox, etc.

The nonwoven material 1 can originally be almost any weight and thickness prior to the surface densification process. Preferably, the nonwoven material 1 would be a lightweight web in the range of 0.5-9 oz/ft$^2$, preferably 1.5-6 oz/ft$^2$. A thickness of the nonwoven material 1 should be within the range of 5-40 mm, preferably 10-35 mm before processing.

Referring again to FIG. 1, heat and pressure is applied to at least one side of the single layer of nonwoven material 1 to form the gradient density padding material 3 of the present invention. A portion 5 of the gradient density padding material 3 has an increased density with respect to a remaining portion or non-densified base portion 7 of the gradient density padding material 3. The gradient density padding material 3 should be processed to result in an air flow resistance of the gradient density padding material 3 to be within the range of 200-4000 MKS Rayls, preferably 400-2000 MKS Rayls. Such processing obtains a very effective acoustic product, which is cost effective.

The gradient density padding material 3 of the present invention is an acoustically tunable material. Specifically, the air flow resistance can be manipulated under a predetermined amount of heat and pressure in order to obtain a product which has improved performance in a particular frequency range. Accordingly, the gradient density padding material 3 of the present invention can be easily designed to a particular application, depending on the results that are intended to be achieved.

Referring to FIG. 2, the nonwoven material 1 can be preheated on a top surface thereof before being heated and compressed by, for example, a hot knife, infrared, etc. As mentioned above, the amount of heat and pressure that should be applied will vary depending upon the results that are intended to be achieved. However, heat within the range of 450 to 550° F. would be sufficient to obtain a desirable product, depending on the melt point of the fibers used in a particular application. In particular, it is preferable to process the nonwoven material 1 at a temperature and pressure that avoids complete melting of the fibers at the outermost surface thereof. This will prevent the resulting gradient density padding material 3 from including a non-flexible, brittle outermost surface, and therefore increase the post process handling of the gradient density padding material 3.

It should be noted that the padding material 3 of the present invention is referred to as a "gradient density" padding material, since the density of the densified portion does not have to be a uniform density throughout a thickness thereof. As described above, heat and pressure is applied to the top surface of the nonwoven material 1 in order to increase the density of the increased density portion 5 to change the air flow resistance of the resulting padding material 3. In view of this process, the top most surface of the nonwoven material 1, which is closest to the source of heat, becomes more dense than a portion spaced from the top most portion (the bottom most portion of the increased density portion 5). In addition, the non-densified base portion 7 has a density after processing, which is substantially the same as the original density of the nonwoven material 1. Accordingly, the padding material 3 has a "gradient density."

FIG. 2 illustrates that the nonwoven material 1 is preheated and hot and cold rollers H and C are used to apply the heat and pressure. However, one having ordinary skill in the art would readily recognize that it is not required to preheat the nonwoven material 1, and the heat and pressure can be applied in ways other than with the use of hot and cold rolls H and C. For example, a heated belt can be used instead of the hot and cold rolls H illustrated in FIG. 2.

As an alternative, heated rolls or belts can be used on both the top and bottom surfaces of the nonwoven padding material to produce a dual-walled product having increased density portions on the top and bottom of the padding material. This padding material can be used in this manner to provide a padding material having two portions with an increased density. Specifically, the top and bottom surfaces of the gradient density padding material 3 will have increased density portions, while the middle of the material 3 does not have an increased density. It should also be noted that the top and bottom of the material 3 can be processed at different temperature and/or temperature in order to form three portions having a different density.

In addition, the above-described gradient density padding material, which has two increased density portions can be cut in half in the machine direction of the padding material to form two padding materials having a single increased density portion. As will be described below, each of the two padding materials will have an increased density portion and a less dense portion. The padding materials can then be used in any of the applications mentioned in the present disclosure. By cutting the padding material having two increased density portions in half, the processing time and therefore the cost of production of the padding material can be substantially decreased.

A thickness of the increased density portion should be within the range of T=5-80%, preferably 5-30% of the total thickness of the nonwoven material after processing. As mentioned above, the total thickness after processing should be approximately 25.4 mm or less in most applications.

Figure 4:
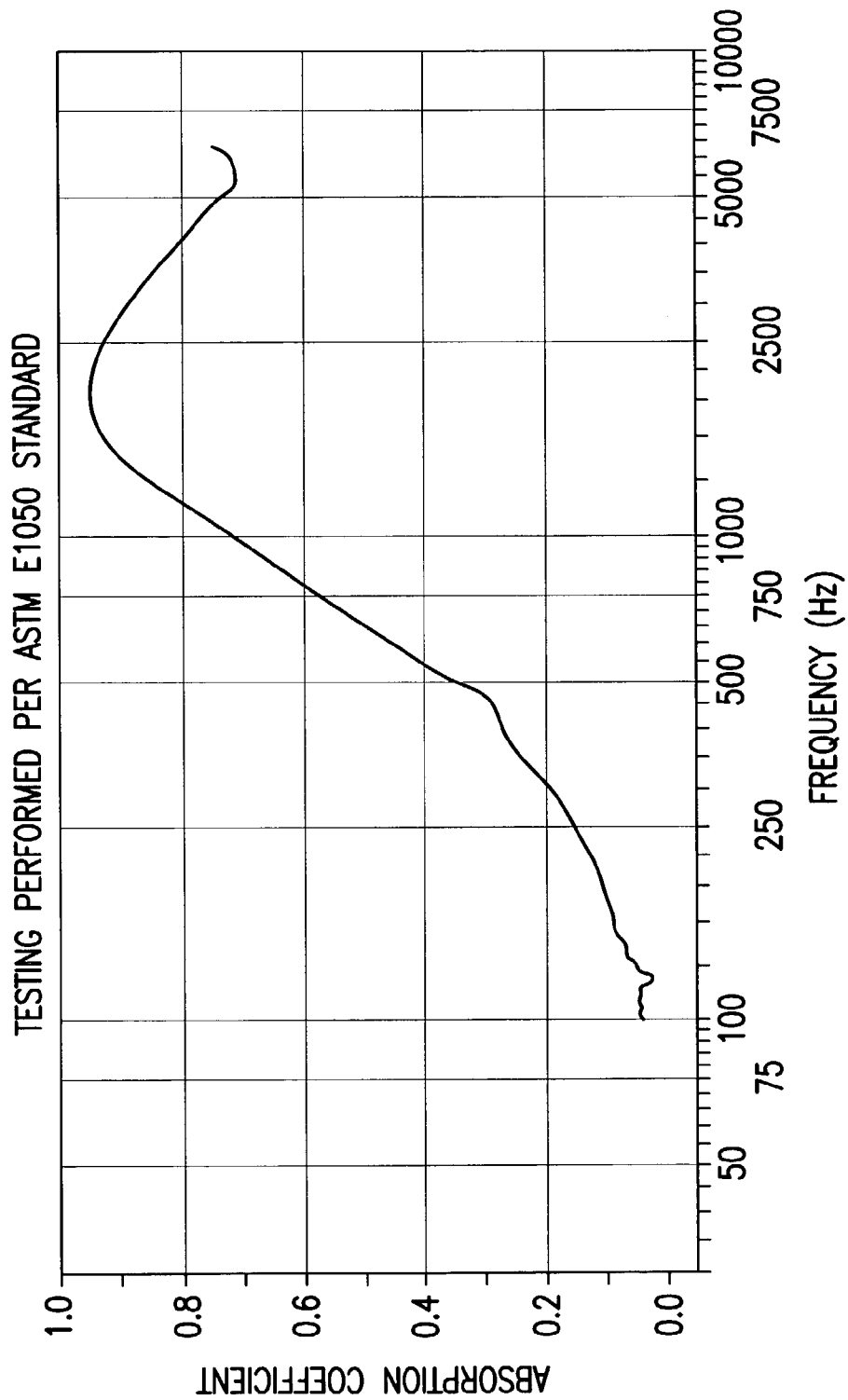
FIG. 4 is a graph of the absorption coefficient vs. frequency after the gradient density process of the present invention is performed to illustrate the increased performance of the present invention.

Referring to FIGS. 3 and 4, the absorption coefficient vs. frequency has been plotted before and after the gradient density process of the present invention has been performed. Referring to FIG. 3, the padding material itself has good absorption properties in the high frequency range. However, in the low frequency range, the absorption is unsatisfactory for most applications. Referring to FIG. 4; however, once the padding material has undergone the gradient density process of the present invention, the absorption properties of the padding material have been increased over the entire low frequency range. In addition, no high frequency degradation has occurred.

The gradient density padding material 3 of the present invention can be used in any interior or exterior acoustic applications for vehicles. For example, the gradient density padding material 3 of the present invention can be used for interior application, such as dash interior and under carpet applications, or exterior application, such as tunnel shields. However, it should be understood that the gradient density padding material 3 of the present invention can be used in any application that calls for high acoustic performance other than automotive.

The gradient density padding material 3 of the present invention can be molded after the initial processing into complex shapes to fit the necessary geometry in many different automotive and non-automotive applications. Accordingly the padding material 3 of the present invention can be used anywhere that fibrous or foamed acoustic products are being used today. For example, the gradient density padding material 3 of the present invention can be used in molded carpets, molded exterior, etc.

Figure 5:
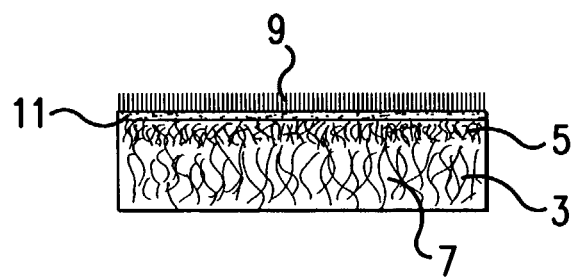
FIG. 5 is a cross-section through the gradient density padding material of the present invention in conjunction with a carpet.

Referring to FIG. 5 of the present invention, the gradient density padding material 3 of the present invention is illustrated in an under carpet application. The gradient density padding material 3 of the present invention can be attached to a carpet 9 having a backing 11 during the molding process of the carpet 9. In view of this, it is unnecessary to use adhesives to attach the carpet 9 to the padding material 3.

Although FIG. 5 illustrates the used of the padding material 3 of the present invention with a carpet, it should be understood that the applications are not limited to carpets. For example, other nonwoven, woven, films, foils and/or adhesive layers can be used in addition to, or in place of the carpet 2 of FIG. 5.

Figure 6:
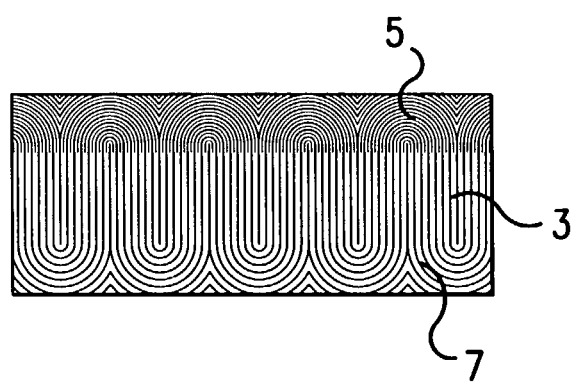
FIG. 6 is a cross-section through the gradient density padding material of the present invention according to an embodiment of the present invention.

Referring to FIG. 6 of the present invention, the gradient density padding material 3 is illustrated as being constructed from a vertically lapped nonwoven material. The vertically lapped nonwoven material can be the type described in International Publication No. WO 02/095111, published Nov. 28, 2002, which is incorporated herein by reference. In addition, the gradient density padding material of the present invention can be used in any of the applications described in the above-identified international application to obtain an improved acoustic product having all of the advantages of a vertically lapped material. Referring to FIG. 6, the gradient density padding material 3 includes an increased density portion 5 and a low density base portion 7.

The gradient density padding material 3 of the present invention can also be used to produce an aesthetic as well as an acoustic product. As mentioned above, the padding material 3 of the present invention can be processed with heat and pressure on both the top and bottom of the material. The material can then be cut in half to obtain two separate products having the acoustic properties of the present invention. Each of the two products can be used in conjunction with other functional or non-functional layers of material or can be used alone. When used alone, it is preferable that the fibers used in the making of the padding material be colored in order to increase the aesthetic appeal of the resulting product. In this way, the padding material can be used as, for example, a carpet or headliner, which has increased acoustic performance without the necessity of additional layers of material.

With specific regard to the gradient density padding material of the present invention being used as a carpet, the use of the above-mentioned vertically lapped material is particularly advantageous. First, the fibers are fused together in the process of making the vertically lapped material. Accordingly, the carpet has increased wear characteristics. Second, the fibers are generally vertical, eliminating the necessity of a secondary process of straightening the fibers as in other nonwoven carpet processes. Third, the increased density portion of the padding material performs the dual function of increasing the acoustic performance of the carpet, as well as locking the fibers together. Accordingly, there is no need for a backing layer to secure the fibers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An acoustically tuned gradient density padding material comprising a nonwoven material including a first portion having a first density and a second portion surface having a second density increased with respect to the first density, wherein the padding material is adapted to provide acoustical absorption in frequencies from about 750 to 2500 Hz, manufactured according to a process comprising the steps of:
  passing a single layer web of nonwoven material between upper and lower belts or rolls;
  applying heat to the web with at least one of the upper and lower belts or rolls and applying pressure to the upper and lower belts or rolls to densify at least one portion of the nonwoven material without completely melting the fibers of the outermost surface of the nonwoven to produce at least one heat and pressure densified portion;
  wherein the densified portion has a higher density than another portion of the nonwoven material to impart a density gradient to the padding material;
  wherein the padding material exhibits an acoustic absorption coefficient greater than 50% in the frequency range of 750 Hz to 2500 Hz.

2. The acoustically tuned gradient density padding material of claim 1, wherein the manufacturing process further comprises the step of applying densification heat through only one of the belts or rolls to manufacture a padding material with only one heat and pressure densified portion.

3. The acoustically tuned gradient density padding material of claim 1, wherein the manufacturing process further comprises the step of applying densification heat through both of the upper and lower belts or rolls to manufacture a padding material with two heat and pressure densified portions.

4. The acoustically tuned gradient density padding material of claim 1, wherein heat is applied by only one of the belts or rolls.

5. The acoustically tuned gradient density padding material of claim 1, wherein the padding material exhibits an acoustic absorption coefficient greater than 50% in the frequency range of 750 Hz to 5000 Hz.

6. The acoustically tuned gradient density padding material of claim 1, wherein the densified portion has a thickness of 25.4 mm or less.

7. The acoustically tuned gradient density padding material of claim 1, wherein the padding material has an air flow resistance of about 200 to 4000 MKS Rayls.

8. The acoustically tuned gradient density padding material of claim 1, wherein the nonwoven material comprises at least about 65% thermoplastic fibers, and has a weight of about 0.5 to 9 oz/ft$^2$.

9. The acoustically tuned gradient density padding material of claim 1, wherein the nonwoven material has 100% thermoplastic fibers.

10. The acoustically tuned gradient density padding material of claim 1, wherein the weight of the nonwoven material is within the range of 1.5-6 oz/ft$^2$.

* * * * *